(12) United States Patent
Fleischmann et al.

(10) Patent No.: US 11,679,553 B2
(45) Date of Patent: Jun. 20, 2023

(54) COMPOSITIONS FOR PRINTING

(71) Applicant: Hewlett-Packard Development Company, L.P., Spring, TX (US)

(72) Inventors: Carolin Fleischmann, San Diego, CA (US); Hector Lebron, San Diego, CA (US); Yi Feng, San Diego, CA (US); Jesiska Tandy, San Diego, CA (US); Alay Yemane, San Diego, CA (US); Ali Emamjomeh, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/859,922

(22) Filed: Jul. 7, 2022

(65) Prior Publication Data

US 2022/0339862 A1 Oct. 27, 2022

Related U.S. Application Data

(63) Continuation of application No. 16/964,406, filed as application No. PCT/US2018/023349 on Mar. 20, 2018, now Pat. No. 11,413,816.

(51) Int. Cl.
| | |
|---|---|
| *B29C 64/165* | (2017.01) |
| *B33Y 10/00* | (2015.01) |
| *B33Y 70/00* | (2020.01) |
| *C09D 11/322* | (2014.01) |
| *C09D 11/324* | (2014.01) |
| *B33Y 70/10* | (2020.01) |

(52) U.S. Cl.
CPC ............ *B29C 64/165* (2017.08); *B33Y 10/00* (2014.12); *B33Y 70/00* (2014.12); *B33Y 70/10* (2020.01); *C09D 11/322* (2013.01); *C09D 11/324* (2013.01)

(58) Field of Classification Search
CPC ..... B29C 64/153; B29C 64/165; B33Y 10/00; B33Y 70/00
See application file for complete search history.

(56) References Cited

U.S. PATENT DOCUMENTS

| | | | |
|---|---|---|---|
| 4,334,056 A | 6/1982 | Meyer et al. | |
| 11,413,816 B2 * | 8/2022 | Fleischmann | ........ C09D 11/322 |
| 2004/0138363 A1 | 7/2004 | Baumann et al. | |
| 2014/0221528 A1 | 8/2014 | Ribi | |
| 2015/0251247 A1 | 9/2015 | Monsheimer et al. | |
| 2016/0161872 A1 | 6/2016 | Orrock et al. | |

(Continued)

FOREIGN PATENT DOCUMENTS

| | | |
|---|---|---|
| CN | 105238041 A | 1/2016 |
| EP | 2969482 A1 | 1/2016 |
| WO | 2014/152531 A1 | 9/2014 |

(Continued)

*Primary Examiner* — Mary Lynn F Theisen
(74) *Attorney, Agent, or Firm* — Dierker & Kavanaugh, P.C.

(57) ABSTRACT

The present disclosure relates to a composition for printing a three-dimensional object. The composition comprises composite particles comprising a thermoplastic polymer and a colour-masking pigment. The colour-masking pigment is encapsulated by the thermoplastic polymer and is present in an amount of from about 1.5 to less than about 6 wt % of the total weight of the composite particles.

15 Claims, 6 Drawing Sheets

(56) References Cited

U.S. PATENT DOCUMENTS

2017/0028632 A1  2/2017  Cox et al.
2019/0240900 A1  8/2019  Jansen et al.

FOREIGN PATENT DOCUMENTS

| WO | 2017/012785 A1 | 1/2017 |
| WO | 2017/040897 A1 | 3/2017 |
| WO | 2017/069778 A1 | 4/2017 |
| WO | 2017/123743 A1 | 7/2017 |
| WO | 2017/131758 A1 | 8/2017 |
| WO | 2017/196358 A1 | 11/2017 |
| WO | 2017/196364 A1 | 11/2017 |

\* cited by examiner

COMPOSITIONS FOR PRINTING

CROSS-REFERENCE TO RELATED APPLICATIONS

This application is a continuation of U.S. application Ser. No. 16/964,406, filed Jul. 23, 2020, which itself is a national stage entry under 35 U.S.C. § 371 of PCT/US2018/023349, filed Mar. 20, 2018, each of which is incorporated by reference herein in its entirety.

BACKGROUND

Methods of 3-dimensional (3D) digital printing, a type of additive manufacturing, have continued to be developed over the last several years. Various methods for 3D printing have been developed, including heat-assisted extrusion and photolithography, as well as others. In general, 3D printing technology improves the product development cycle by allowing rapid creation of prototype models for reviewing and testing.

Figure 1:
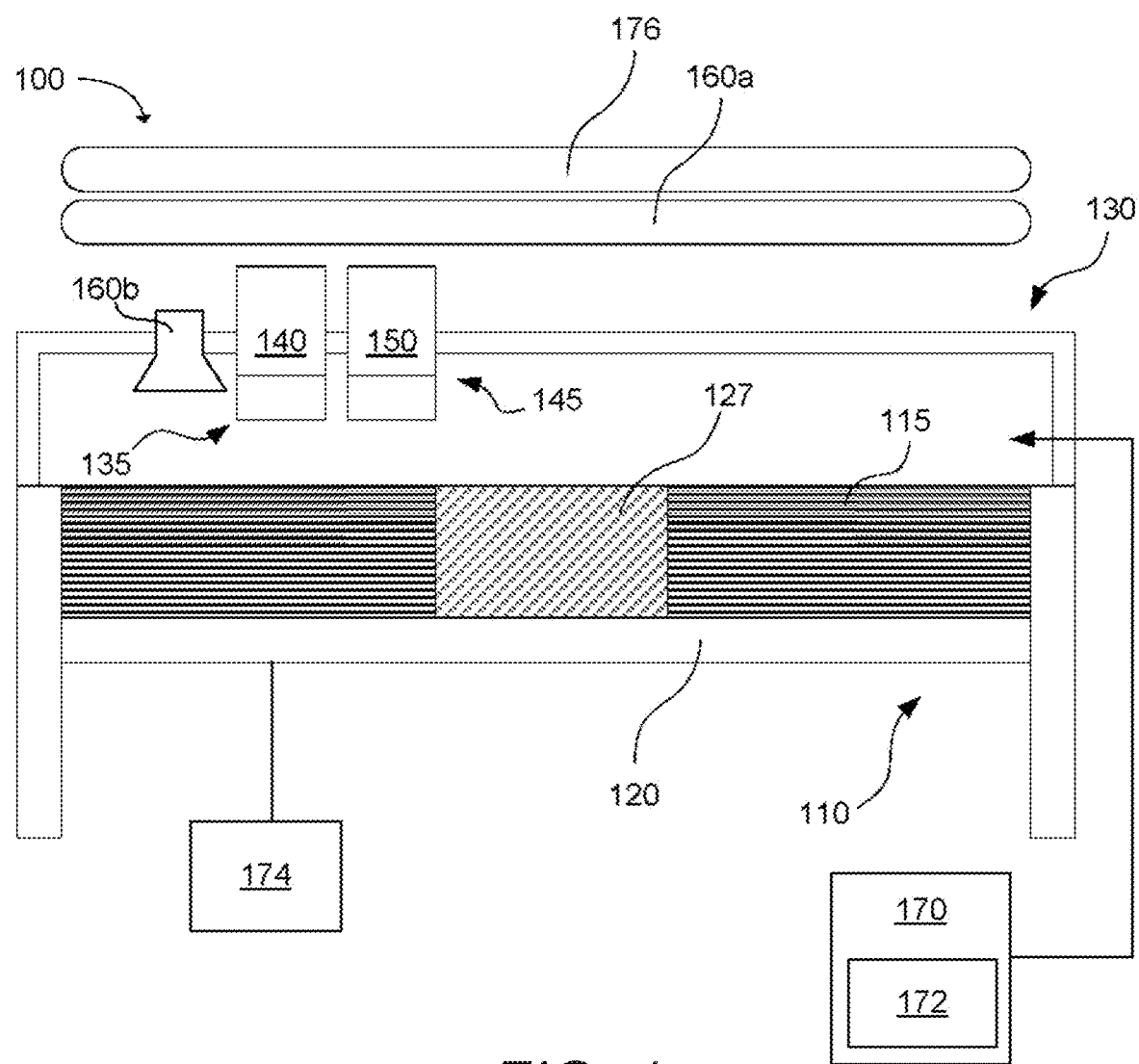
FIG. 1 is a schematic view of an example of a 3-dimensional printing system that may be used to perform a 3-dimensional printing method according to an example of the present disclosure.

The figures depict several examples of the present disclosure. However, it should be understood that the present disclosure is not limited to the examples depicted in the figures.

DETAILED DESCRIPTION

It is to be understood that this disclosure is not limited to the compositions or methods disclosed herein. It is also to be understood that the terminology used in this disclosure is used for describing particular examples. The terms are not intended to be limiting because the scope of the present disclosure is intended to be limited by the appended claims and equivalents thereof.

It is noted that, as used in this specification and the appended claims, the singular forms "a," "an," and "the" include plural referents unless the context clearly dictates otherwise.

As used in the present disclosure, "liquid vehicle" refers to a liquid in which at least one additive may be dissolved or dispersed to form an inkjet composition. A wide variety of liquid vehicles may be used with the compositions and methods of the present disclosure. A variety of different additives, including, surfactants, solvents, co-solvents, anti-kogation agents, buffers, biocides, sequestering agents, viscosity modifiers, and surface-active agents may be dispersed or dissolved in the liquid vehicle.

The term "fusing agent" is used herein to describe agents that may be applied to powder bed material, and which may assist in binding or coalescing the powder bed material to form a layer of a 3D part. Heat may be used to fuse the powder bed material, but the fusing agent can also assist in binding powder together, and/or in generating heat from electromagnetic energy (e.g. infrared and near infrared). For example, the fusing agent may become energized or heated when exposed to a frequency or frequencies of electromagnetic radiation. Any additive that assists in binding or fusing particulate powder bed material to form the 3D printed part can be used.

As used in the present disclosure, "jet," "jettable," "jetting," or the like refers to compositions that are ejected from jetting architecture, such as inkjet architecture. Any suitable inkjet architecture may be used. For example, the inkjet architecture can include thermal or piezo architecture. Additionally, such architecture can be configured to print varying drop sizes, for example, less than 50 pl, less than 40 pl, less than 30 pl, less than 20 pl, less than 10 pl. In some examples, the drop size may be 1 to 40 pl, for example, 3 or 5 to 30 picolitres.

As used in the present disclosure, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context.

As used in the present disclosure, the term "powder bed material" refers to the particulate build material used to build the 3-D printed object. The term "powder bed material" refers to any suitable particulate build material. For example, the powder bed material may comprise polymer, ceramic or metal particles. The powder bed material may also comprise particles of any shape. For example, the particles may be substantially spherical, substantially ovoid, irregularly shaped and/or elongate in shape. In some examples, the particles of powder bed material may be substantially spherical. In some examples, the particles of the powder bed material may take the form of fibers, for instance, cut from longer strands or threads of material. The powder bed material may comprise particles that comprise thermoplastic polymer and colour-masking pigment.

As used in the present disclosure, the term "about" is used to provide flexibility to a numerical range endpoint. The degree of flexibility of this term can be dictated by the particular variable and determined based on the associated description herein.

As used in the present disclosure, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the limits of the range, but also to include individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting one numerical value. Furthermore, such an interpretation should apply regardless of the breadth of the range or the characteristics being described.

The present disclosure relates to a composition for printing a three-dimensional object. The composition comprises composite particles comprising a thermoplastic polymer and a colour-masking pigment. The colour-masking pigment is encapsulated by the thermoplastic polymer and is present in an amount of from about 1.5 to less than about 6 wt % of the total weight of the composite particles.

The present disclosure also relates to a kit for three-dimensional printing. The kit comprises a powder bed material comprising thermoplastic polymer and colour-masking pigment. The colour-masking pigment is present in an amount of from about 0.1 to about 10 wt % based on the total weight of the powder bed material. The kit also comprises a fusing agent comprising an infrared or near infrared absorber.

In a further aspect, the present disclosure relates to a method for three-dimensional printing. The method comprises:

depositing a layer of powder bed material on a build platform, wherein the powder bed material comprises thermoplastic polymer and colour-masking pigment, and the colour-masking pigment is present in an amount of 0.1 to 10 wt % based on the total weight of the powder bed material;

based on a 3D object model, selectively applying a fusing agent onto at least a portion of the layer of the powder bed material, and heating the powder bed material to at least partially bind the portion of the powder bed material.

Fusing agents comprising infrared or near infrared absorbers may also absorb across a range of wavelengths in the visible spectrum. Accordingly, many fusing agents may have a dark appearance. Thus, it has been found that white 3-D printed parts can sometimes appear grey, while coloured 3-D printed parts can have reduced gamut and/or vibrancy. In some examples where the fused powder bed material may have a translucent appearance, the reduction in colour performance may be more marked as the dark fusing agent may be visible from the exterior of the 3-D printed part.

It has been found that, to improve colour performance, a colour-masking pigment may be included in the powder bed material. By tailoring the amount of colour-masking pigment in the powder bed material, a balance between white, colour and black performance may be achieved, while, at the same time, maintaining desirable mechanical properties of the 3-D printed part. In some examples, the powder bed material may include composite particles in which the colour-masking pigment is encapsulated by the thermoplastic polymer. In some examples, such composite particles may be used to provide a more homogeneous distribution of the colour-masking pigment. In some examples, this can improve the colour performance of the 3-D printed part.

Powder Bed Material

As mentioned above, the powder bed material comprises powder or particles comprising thermoplastic polymer and colour-masking pigment. The particles may have an average particle size of at least about 10 µm, for example, at least about 15 µm, at least about 20 µm, at least about 30 µm, at least about 40 µm or at least about 50 µm. The particles may have an average particle size of at most about 120 about, for example, at most about 110 µm, at most about 100 µm, at most about 90 µm, at most about 80 µm or at most about 75 µm.

In some examples, the powder bed material may have an average particle size of from about 10 to about 120 µm, for example, about 15 to about 110 µm. In some examples, the powder bed material may have an average particle size of from about 20 to about 100 µm, about 30 to about 90 µm, about 40 to about 80 µm or about 50 to about 75 µm. As used in the present disclosure, "average" with respect to properties of particles refers to a volume average unless otherwise specified. Accordingly, "average particle size" refers to a volume average particle size. Additionally, "particle size" refers to the diameter of spherical particles, or to the longest dimension of non-spherical particles. Particle size may be determined by any suitable method, for example, by laser diffraction spectroscopy.

In accordance with some examples, the volume-based particle size distribution of the powder bed material can be as follows: D50 can be from about 45 µm to about 75 µm, from about 55 µm to about 65 µm, or about 60 µm; D10 can be from about 20 µm to about 50 µm, from about 30 µm to about 40 µm, or about 35 µm; and D90 can be from about 75 µm to about 100 µm, from about 80 µm to about 95 µm, or about 90 µm. "D50" is defined as the median particle diameter (by volume). "D10" is defined as the tenth-percentile by volume of powder that is below a given particle size, e.g., from about 20 µm to about 50 µm. "D90" is defined as the ninetieth-percentile by volume of powder that is below a given particle size, e.g., about 75 µm to about 100 µm.

In one example, the particle size distribution of the powder bed material is as follows:

D50 is from about 45 µm to about 70 µm,
D10 is from about 20 µm to about 50 µm, and
D90 is from about 75 µm to about 100 µm.

In certain examples, the particles of the powder bed material can have a variety of shapes, such as substantially spherical particles or irregularly-shaped particles. In some examples, the particles can be capable of being formed into 3D printed parts with a resolution of about 10 to about 120 µm, for example about 20 to about 100 µm or about 20 to about 80 µm. As used herein, "resolution" refers to the size of the smallest feature that can be formed on a 3D printed part. The particles can form layers from about 10 to about 120 µm or 100 µm thick, allowing the fused layers of the printed part to have roughly the same thickness. This can provide a resolution in the z-axis direction of about 10 to about 100 µm. The particles can also have a sufficiently small particle size and sufficiently regular particle shape to provide about 10 to about 100 µm resolution along the x-axis and y-axis.

The powder bed material may also include an anti-oxidant. The anti-oxidant can be sterically hindered phenol derivatives. The anti-oxidant can, for example be in the form of fine particles, e.g., 5 µm or less, that are e.g. dry blended with the remaining particles of the powder bed material. The anti-oxidant may be present at a concentration of at least about 0.01 wt %, for example, at least about 0.05 wt %, at least about 0.1 wt % or at least about 0.2 wt %. The anti-oxidant may be present at a concentration of at most about 2 wt %, for example, at most about 1.5 wt % or at most about 1 wt %. In some examples, the anti-oxidant may be present in an amount of e.g., from 0.01 wt % to 2 wt % or from 0.2 wt % to 1 wt % of the powder bed material.

The powder bed material can, in some cases, also comprise a filler. The filler can include inorganic particles such as alumina, silica, glass, and/or other similar fillers. In some examples, the filler can include a free-flow filler, anti-caking filler, or the like. Such fillers can prevent packing of the powder bed material, and/or coat the particles of the powder bed material and smooth edges to reduce inter-particle friction, and/or absorb moisture. In some examples, a weight ratio of thermoplastic polymer to filler particles in the powder bed material can be from 99:1 to 1:2, from 10:1 to 1:1, or from 5:1 to 1:1.

Colour-Masking Pigment

Any suitable colour-masking pigment may be employed in powder bed material of the present disclosure. For example, the colour-masking pigment may be a white pigment. Examples of suitable pigments include titanium dioxide, boron nitride, barium sulfate, zinc sulfide, lead carbonate, antimony oxide and zinc oxide. Mixtures of two or more pigments may be used. In some examples, the colour-masking pigment may be titanium dioxide. In some examples, the colour-masking pigment may be boron nitride. In some examples, the colour-masking pigment may be zinc sulfide (ZnS) or a combination of zinc sulfide and barium sulfate (e.g. $ZnS*BaSO_4$). In some examples, the colour-masking pigment may be basic lead carbonate (e.g. $2PbCO_3*Pb(OH)_2$).

The colour-masking pigment may have an average particle diameter of at least about 60 nm, for example, at least about 100 nm, at least about 110 nm, at least about 120 nm, at least about 130 nm, at least about 140 nm, at least about 150 nm, or at least about 200 nm. The colour-masking pigment may have an average particle diameter of at most 800 nm, at most about 700 nm, at most about 600 nm, at most about 550 nm, at most about 500 nm, at most about 450 nm or at most about 400 nm. In some examples, the average particle size may be about 60 nm to about 800 nm, for instance, about 100 nm to about 700 nm, about 110 nm to about 700 nm, about 120 nm to about 600 nm, about 130 nm to about 550 nm, about 140 nm to about 500 nm, about 150 nm to about 450 nm, or 200 nm to about 400 nm. In some examples, the particle size may be about 150 nm to 550 nm, for example about 200 nm to about 400 nm.

The colour-masking pigment may be present in an amount of about 0.1 to about 10 wt % of the total weight of the powder bed material. The colour-masking pigment may be present in an amount of at least about 0.1 wt %, for example, at least about 0.5 wt %, at least about 1 wt %, at least about 1.2 wt %, at least about 1.5 wt %, at least about 2 wt % or at least about 2.5 wt %. The colour-masking pigment may be present in an amount of at most about 10 wt %, for example, at most about 9 wt %, at most about 8 wt %, at most about 7 wt %, at most about 6 wt %, at most about 5.5 wt %, at most about 5 wt % or at most about 4.5 wt % or 4 wt %.

In some examples, the colour-masking pigment may be present in an amount of about 0.5 to about 10 wt %, for instance, about 1 to about 10 wt % or about 1.5 to about 10 wt % of the total weight of the powder bed material. In some examples, the colour-masking pigment may be present in an amount of about 1.2 to about 9 wt %, for example, about 1.5 to about 9 wt %. In some examples, the colour-masking pigment may be present in an amount of about 1.5 to about 8 wt %, for instance, about 1.5 wt % to about 7 wt %, or 1.5 to less than about 6 wt % of the total weight of the powder bed material. In some examples, the colour-masking pigment may be present in an amount of about 1.5 to about 5.5 wt %, about 1.6 wt % to about 5.3 wt %, about 1.8 wt % to about 5.2 wt % or about 2 wt % to about 5 wt % of the total weight of the powder bed material. In some examples, the colour-masking pigment may be present in an amount of about 2 to about 4 wt % or about 3 to about 4 wt % of the total weight of the powder bed material.

The amount of colour-masking pigment may be tailored to achieve desirable colour performance and mechanical properties. For example, while higher levels of colour-masking pigment may allow higher lightness, L*, values to be achieved, in some examples, this may be at the expense of achieving desired black print quality. Furthermore, excessive amounts of colour-masking pigment may, in some examples, have an impact of the mechanical properties of the 3-D printed object, for instance, in terms of elongation at break (EAB). In the present disclosure, the amount of colour-masking pigment may be tailored as described above to provide a desirable balance between colour performance and mechanical properties. In some examples, the amount of colour-masking pigment may be tailored at about 0.1 to about 10 wt %, for example, about 1.5 to about 8 wt % or about 1.5 to less than about 6 weight %

In the present disclosure, particles of the colour-masking pigment may be mixed e.g. dry blended with particles of the thermoplastic polymer of the powder bed material. However, in some examples, the colour-masking pigment may be encapsulated by the thermoplastic polymer to form composite particles. In some examples, the thermoplastic polymer forms a matrix around particle(s) of colour-masking pigment. By using such composite particles, it may be possible to achieve a more homogeneous distribution of the colour-masking pigment in the powder bed material. This may enhance the masking effect, improving the colour performance of the final 3-D printed part. This may also avoid high concentrations of colour-masking pigment accumulating at specific locations in the 3-D printed part, which may compromise colour and/or mechanical properties at those locations.

Where composite particles are employed, the composite particles may have an average particle size of at least about 10 μm, for example, at least about 15 μm, at least about 20 μm, at least about 30 μm, at least about 40 μm or at least about 50 μm. The particles may have an average particle size of at most about 120 about, for example, at most about 110 μm, at most about 100 μm, at most about 90 μm, at most about 80 μm or at most about 75 μm.

In some examples, the composite particles may have an average particle size of from about 10 to about 120 μm, for example, about 15 to about 110 μm. In some examples, the composite particles may have an average particle size of from about 20 to about 100 μm, about 30 to about 90 μm, about 40 to about 80 μm or about 50 to about 75 μm. As used in the present disclosure, "average" with respect to properties of particles refers to a volume average unless otherwise specified. Accordingly, "average particle size" refers to a volume average particle size. Additionally, "particle size" refers to the diameter of spherical particles, or to the longest dimension of non-spherical particles. Particle size may be determined by any suitable method, for example, by laser diffraction spectroscopy.

In accordance with some examples, the particle size distribution of the composite particles can be as follows: D50 can be from about 45 μm to about 75 μm, from about 55 μm to about 65 μm, or about 60 μm; D10 can be from about 20 μm to about 50 μm, from about 30 μm to about 40 μm, or about 35 μm; and D90 can be from about 75 μm to about 100 μm, from about 80 μm to about 95 μm, or about 90 μm. "D50" is defined as the median particle diameter (by volume). "D10" is defined as the tenth-percentile by volume of powder that is below a given particle size, e.g., from about 20 μm to about 50 μm. "D90" is defined as the ninetieth-percentile by volume of powder that is below a given particle size, e.g., about 75 μm to about 100 μm.

In one example, the particle size distribution of the composite particles is as follows:
D50 is from about 45 μM to about 70 μm,
D10 is from about 20 μm to about 50 μm, and
D90 is from about 75 μm to about 100 μm.

Where composite particles used, encapsulation may be carried out using any suitable method. For example, encapsulation may be carried out by compounding. In such a method, particles of the colour-masking pigment (e.g. titanium dioxide) may be dispersed in molten thermoplastic polymer. The mixture may then be formed, for example, into composite pellets, for example, by extrusion. The pellets may then be processed to form a powder, for example, by grinding.

Alternatively, encapsulation may be carried out by precipitating the thermoplastic polymer around particles of the colour-masking pigment. In an example of such a precipitation process, the thermoplastic polymer may be dissolved in a solvent to form a solution. In some examples, the thermoplastic polymer may be dissolved in the solvent at elevated temperatures of, for example, 100 to 200 degrees C., for example, 120 to 160 degrees C. or 140 to 150 degrees C. The temperature may be determined depending on the nature of the thermoplastic polymer and solvent, as well as their relative amounts.

Particles of the colour-masking pigment may then be added to the thermoplastic polymer solution. The temperature of the solution may be reduced and/or the solvent removed, causing the thermoplastic polymer to precipitate out of solution. The temperature of cooling may be determined depending on the nature of the thermoplastic polymer and solvent, as well as their relative amounts.

When the thermoplastic polymer precipitates out of solution, composite particles comprising the thermoplastic polymer and colour-masking pigment may be formed. The precipitated composite particles may comprise particle(s) of colour-masking pigment encapsulated or surrounded by thermoplastic polymer. In some examples, the colour-masking pigment particles dispersed in the thermoplastic polymer solution act as seed particles around which precipitation can occur. The precipitated particle size may be controlled, for example, by the rate of cooling and/or rate of solvent removal as well as agitation.

In some examples, where the thermoplastic polymer is polyamide-12, the polyamide-12 may be dissolved in a solvent comprising ethanol. Particles of a colour-masking pigment may then be added to the solution. The temperature of the solution may be reduced and/or the ethanol solvent removed (e.g. by distillation). The particles of the colour-masking pigment may provide nucleation sites at which precipitation of the polymer can occur. The precipitated particle size may be controlled, for example, by the rate of cooling and/or rate of solvent removal as well as agitation. Examples of precipitation methods are described, for example, in DE 3510687 and DE 2906647.

In some examples, the colour-masking pigment may be selected from at least one titanium dioxide, boron nitride, barium sulfate, zinc sulfide, lead carbonate, antimony oxide and zinc oxide. In one example, the colour-masking pigment may be titanium dioxide. In some examples, the thermoplastic polymer may be a polyamide, for instance, polyamide-12. In some examples, the thermoplastic polymer may be a polyamide (e.g. polyamide-12) and the colour-masking pigment may be selected from at least one of titanium dioxide, boron nitride, barium sulphate and zinc oxide, for instance, titanium dioxide. In some examples, the powder bed material comprises composite particles of a polyamide (e.g. polyamide-12) and titanium dioxide, where particles of titanium dioxide are encapsulated by the polyamide.

Where composite particles are employed, the colour-masking pigment may be present in an amount of about 0.1 to about 10 wt % of the total weight of the composite particles. The colour-masking pigment may be present in an amount of at least about 0.1 wt %, for example, at least about 0.5 wt %, at least about 1 wt %, at least about 1.2 wt %, at least about 1.5 wt %, at least about 2 wt % or at least about 2.5 wt %. The colour-masking pigment may be present in an amount of at most about 10 wt %, for example, at most about 9 wt %, at most about 8 wt %, at most about 7 wt %, at most about 6 wt %, at most about 5.5 wt %, at most about 5 wt % or at most about 4.5 wt % or 4 wt %.

In some examples, the colour-masking pigment may be present in an amount of about 0.5 to about 10 wt %, for instance, about 1 to about 10 wt % or about 1.5 to about 10 wt % of the total weight of the composite particles. In some examples, the colour-masking pigment may be present in an amount of about 1.2 to about 9 wt %, for example, about 1.5 to about 9 wt %. In some examples, the colour-masking pigment may be present in an amount of about 1.5 to about 8 wt %, for instance, about 1.5 wt % to about 7 wt %, about 1.5 to less than about 6 wt % of the total weight of the composite particles.

In some examples, the colour-masking pigment may be present in an amount of about 1.5 to about 5.5 wt %, about 1.6 wt % to about 5.3 wt %, about 1.8 wt % to about 5.2 wt % or about 2 to about 5 wt % of the total weight of the composite particles. In some examples, the colour-masking pigment may be present in an amount of about 2 to about 4 wt % or about 3 to about 4 wt % of the total weight of the composite particles.

Thermoplastic Polymer

The thermoplastic polymer in the powder bed material can have a melting or softening point of at least about 60° C., for example, at least about 70° C., at least about 80° C., at least about 90° C., at least about 100° C., at least about 110° C., at least about 120° C., at least about 130° C., at least about 140° C., at least about 150° C. or at least about 160° C. The melting or softening point may be at most about 350° C., for example, at most about 320° C., at most about 300° C., at most about 280° C., at most about 260° C., at most about 240° C. or at most about 220° C.

In some examples, the melting or softening point may be in the range of about 70° C. to about 350° C. In some examples, the melting or softening point may be in the range of about 80° C. to about 320° C., about 90° C. to about 300° C., about 100° C. to about 280° C., about 110° C. to about 260° C., about 120° C. to about 240° C., about 130° C. to about 220° C., or about 140° C. to about 220° C. In further examples, the polymer can have a melting or softening point from about 150° C. to about 200° C.

In some examples, the thermoplastic polymer can be nylon 6, nylon 9, nylon 11, nylon 12, nylon 66, nylon 612, polyethylene, thermoplastic polyurethane, polypropylene, polyester, polycarbonate, polyether ketone, polyacrylate, polystyrene, or combinations thereof. In some examples, the thermoplastic polymer comprises a polyamide. In some examples, the thermoplastic polymer may comprise polyamide-12. The polyamide-12 can have a melting or softening point from about 160° C. to about 200° C., or about 176

CC to about 190° C. in further examples, the polymer can have a melting or softening point from about 182° C. to about 189° C.

Where polyamide-12 is used, the polyamide-12 can include greater than about 80 meq/g carboxylic end groups (or can include greater than about 90 meq/g) and can include less than about 40 meq/g amino end groups (or can include less than about 30 meq/g). It is noted that by "less than about 40 meq/g," this includes examples where there are substantially no (0 meq/g) amino end groups. As a practical matter and as a technical limit, detection of less than about 2 meq/g of amino end groups can be difficult. Thus, by substantially no amino end groups, this is defined to include no detectable amino end groups, e.g., less than about 2 meq/g. However, in some examples, there may be from about 2 meq/g to less than about 40 meq/g, or from about 5 meq/g to less than about 30 meq/g amino end groups. On the other hand, the upper limit of the carboxylic end groups can be limited by a capacity of end group locations, but in one example, the carboxylic end groups can be from greater than about 80 meq/g to about 200 meq/g, or from about 90 meq/g to about 200 meq/g, or from greater than about 80 meq/g to about 170 meq/g, or from about 90 meq/g to about 170 meq/g. End group values can be determined by titration.

The molecular weight of the thermoplastic polymer (e.g. polyamide-12) can be characterized using relative solution viscosity (or "solution viscosity" for brevity) as a proxy for molecular weight. "Solution viscosity" is defined by combing 0.5 wt % thermoplastic polymer (e.g. polyamide-12) with 99.5 wt % M-cresol and measuring the viscosity of the admixture at room temperature. Further details for determining solution viscosity under this measurement protocol are described in International Standard ISO 307, Fifth Edition, 2007-05-15.

The solution viscosity measurement can be used, in some examples, as a proxy for molecular weight, and measures the viscosity using a capillary viscometer. The measurement is based on the time it takes for a certain volume of liquid (solvent or solution) to pass through a capillary viscometer under its own weight or gravity compared to the same fluid (solvent or solution) admixed with a small amount of the polymer powder. The higher the viscosity, the longer it takes for the fluid to pass through. Thus, solution viscosity is defined as a ratio that compares the time for a fluid with the polymer powder to pass through the capillary compared to the time it takes for the fluid alone to pass therethrough. Thus, the fluid with the polymer is more viscous than the pure fluid, so the ratio is always a number greater than 1. In accordance with the present disclosure, by way of example, if it takes m-cresol solvent 120 second to go through the capillary viscometer, and it takes solution of 0.5 wt % of polyamide-12 in 99.5 wt % m-cresol 180 second to go through the same capillary viscometer, then the relative solution viscosity is 180/120 which is 1.5.

In accordance with examples of the present disclosure, because the powder may typically be exposed to heat during 3-dimensional printing of the order of about 120 to 160° C. (e.g., feed powder temperature about 120-140° C., platform heater about 145-155° C., powder temperature from heating lamps during printing at about 160° C., etc.), one reactivity test may include exposing the powder to 165° C. for 20 hours with an air environment (which may be slightly harsher than typical printing conditions). This is not to say that different temperatures may not otherwise be used. However, in some examples, for instance, for certain thermoplastic polymers, to determine solution viscosity before and after exposure to prolonged heat, the profile of 165° C. for 20 hours in air is used when discussing solution viscosity values. Thus, under these conditions, thermal degradation can be evaluated by determining a change (e.g. an increase due to continue polymerization through reactive end groups) in solution viscosity to establish relative solution viscosity stability, which correlates to relative molecular weight stability, e.g., change in solution viscosity less than about 10% or less than about 5% indicates relative molecular weight stability within a certain range.

In further detail regarding molecular weight stability (characterized using solution viscosity stability as a proxy for measuring molecular weight and change in molecular weight after exposure to heat for a period of time), the chemistry of thermoplastic polymer (e.g. polyamide-12 polymer chains) can undergo oxidation or thermal degradation when exposed to heat. In accordance with examples of the present disclosure, by preparing thermoplastic polymer (e.g. polyamide-12) having a molecular weight range with a solution viscosity from 1.85 to 2, and by having greater than 80 meq/g carboxylic end groups and less than 40 meq/g amino end groups, at 165° C./20 hrs/air, the thermal degradation can be largely counterbalanced by the reactivity of the end groups. Thus, on average, shorter chain polymers that may be formed by thermal degradation of the thermoplastic polymer (e.g. polyamide-12) can likewise react with other oxidized or non-oxidized polymer chains using the end groups. By balancing the breakdown and the reactivity, the average polymer chain length (e.g., molecular weight or solution viscosity) can remain similar to the initial polymer chain length (e.g., molecular weight or solution viscosity). In other words, in some examples, the thermoplastic polymer (e.g. polyamide-12 powder) may have a molecular weight or solution viscosity with a range that is useful for 3-dimensional printing described herein, and the reactivity of the thermoplastic polymer (polyamide-12 powder) end groups is such that it is similarly matched to compensate for thermal degradation (which inherently lowers the molecular weight), e.g., with up to a 10% change at 165° C. for 20 hours in air. In one specific example, the solution viscosity may be initially at room temperature from 1.9 to 2.0 and may be minimally increase after exposure to 165° C. for 20 hours in air, e.g., increased to from 2.0 to 2.1.

Fusing Agent

The fusing agent may comprise an infrared absorber or near infrared absorber. In some examples, the infrared absorber or near infrared absorber may absorb electromagnetic radiation in the range of 700 nm to 1 mm. In many cases, the infrared absorber or near infrared absorber can have a peak absorption wavelength in the range of 800 nm to 1400 nm.

In some examples, the near infrared absorber can be carbon black, tungsten bronze, molybdenum bronze, conjugated polymer, aminium dye, tetraaryldiamine dye, cyanine dye, phthalocyanine dye, dithiolene dye, metal phosphate, metal silicate or mixtures thereof.

The near infrared absorber may be a near infrared absorbing dye. Examples of near-infrared absorbing dyes include aminium dyes, tetraaryldiamine dyes, cyanine dyes, phthalocyanine dyes, dithiolene dyes, and others.

In further examples, the near infrared absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly(acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. The silicates can have the same or similar counterions as the phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In some examples, the near infrared absorber may comprise carbon black.

In some examples, the near infrared absorber and/or infrared absorber, may be dissolved or dispersed in a liquid vehicle. The fusing agent may be a liquid composition comprising the near infrared absorber or infrared absorber and a liquid vehicle. The fusing agent may be printed over a layer of the powder bed material based on a 3-D object model. In some examples, the fusing agent may be an inkjet composition that is applied by inkjet printing.

The liquid vehicle can include water. In some examples, an additional co-solvent may also be present. In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present at a concentration of at least about 1 wt %, for example, at least about 1.5 wt % of the total weight of the fusing agent. The co-solvent, where employed may be present in an amount of at most about 50 wt %, for example, at most 40 wt %, at most 35 wt % or at most 30 wt %. In some examples, the co-solvent may be present in an amount of from about 1 wt % to about 40 wt % of the total weight of the fusing agent.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

A surfactant, or combination of surfactants, can also be present in the fusing agent. Examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Various other additives can be employed to optimize the properties of the fusing agent for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities. Buffers may also be used to control the pH of the composition. Viscosity modifiers may also be present. Such additives can be present at from 0.01 wt % to 20 wt % of the fusing agent.

The amount of infrared absorber or near infrared absorber can vary depending on the type of absorber. In some examples, the concentration of infrared absorber or near infrared absorber in the fusing agent can be from 0.1 wt % to 20 wt % of the fusing agent. In one example, the concentration of absorber in the fusing ink can be from 0.1 wt % to 15 wt %. In another example, the concentration can be from 0.1 wt % to 8 wt %. In yet another example, the concentration can be from 0.5 wt % to 2 wt %. In a particular example, the concentration can be from 0.5 wt % to 1.2 wt %.

In some examples, the infrared absorber or near infrared absorber can absorb in the infrared and/or near infrared spectrum, as well as in the visible spectrum. In some examples, the absorber can absorb electromagnetic radiation in the range of 700 nm to 1 mm, as well as electromagnetic radiation in the range of 390 to 700 nm. In some examples, the near infrared absorber and/or infrared absorber has a dark appearance. For instance, the near infrared absorber and/or infrared absorber can have a black or grey colour. Absorber formed, for example, carbon black may have a black appearance.

In the absence of any colour-masking pigment in the powder bed material, fusing agent applied to the powder bed material may impart an undesirable colour or dark shade to the 3-D printed part. In the presence of the colour-masking pigment, however, the colour or dark appearance imparted by the fusing agent may be at least partially masked. This can allow white 3-D printed parts to be produced with greater lightness, L*. When coloured inks are printed onto the powder bed material during the 3-D printing process to impart colour(s) to at least part of the 3-D printed part, the colour performance (e.g. colour gamut and vibrancy) achieved may also be improved.

The fusing agent can have a temperature boosting capacity. This temperature boosting capacity may be used to increase the temperature of the thermoplastic polymer in the powder bed material above the melting or softening point of the polymer. As used herein, "temperature boosting capacity" refers to the ability of a fusing agent to convert infrared (e.g. near-infrared) energy into thermal energy. When fusing agent is applied to the powder bed material (e.g. by printing), this temperature boosting capacity can be used to increase the temperature of the treated (e.g. printed) portions of the powder bed material over and above the temperature of the untreated (e.g. unprinted) portions of the powder bed material. The particles of the powder bed material can be at least partially bound or coalesced when the temperature increases to or above the melting point of the polymer.

As used herein, "melting point" refers to the temperature at which a polymer transitions from a crystalline phase to a pliable, amorphous phase. Some polymers do not have a single melting point, but rather have a range of temperatures over which the polymers soften. When the fusing agent is selectively applied to at least a portion of the polymer powder, the fusing agent can heat the treated portion to a temperature at or above the melting or softening point, while the untreated portions of the polymer powder remain below the melting or softening point. This allows the formation of a solid 3D printed part, while the loose powder can be easily separated from the finished printed part.

In one example, the fusing agent can have a temperature boosting capacity from about 10° C. to about 70° C. for a polymer with a melting or softening point of from about 100° C. to about 350° C. If the powder bed is at a temperature within about 10° C. to about 70° C. of the melting or softening point, then such a fusing agent can boost the temperature of the printed powder up to the melting or softening point, while the unprinted powder remains at a lower temperature. In some examples, the powder bed can be preheated to a temperature from about 10° C. to about 70° C. lower than the melting or softening point of the polymer. The fusing agent can then be applied (e.g. printed) onto the powder and the powder bed can be irradiated with a near-infrared light to coalesce the treated (e.g. printed) portion of the powder.

Colorant

In some examples, colorant may be applied to the powder bed material. Colorant may be applied to at least the outer surface of the printed part. The colorant may be visible to the naked eye and may be employed in sufficient amounts to impart a discernible colour to the printed part. The colorant may be a visible dye or a visible pigment. Such colorants may be applied by printing an inkjet composition or agent comprising a colorant onto the powder bed material.

The inkjet composition or agent may comprise colorant and liquid vehicle. In some examples, the colorant can be present in an amount of at least about 0.1 wt %, for example, at least about 0.2 wt %, at least about 0.5 wt %, or at least about 1 wt %. The colorant may be present in an amount of at most about 10 wt %, for example, at most about 8 wt %, at most about 6 wt %. In some examples, the colorant may be present in an amount of from about 0.5 wt % to about 10 wt % in the inkjet composition. In one example, the colorant can be present in an amount from about 1 wt % to about 5 wt %. In another example, the colorant can be present in an amount from about 5 wt % to about 10 wt %.

In some examples, the inkjet composition comprising the colorant may be applied to at least portions of a layer of powder bed material to impart colour to the printed part. The inkjet composition comprising the colorant may be applied to unfused powder bed material. Such an inkjet composition may be applied before or after the application of fusing agent to the powder bed material.

The colored inkjet composition can include any suitable colorant, including dyes and/or pigments. This can allow for printing of full-color 3-dimensional parts. Suitable inkjet compositions can include cyan, magenta, yellow, and black colorants.

In some examples, the colorant can be a dye. The dye may be nonionic, cationic, anionic, or a mixture of nonionic, cationic, and/or anionic dyes. Specific examples of dyes that may be used include, but are not limited to, Sulforhodamine B, Acid Blue 113, Acid Blue 29, Acid Red 4, Rose Bengal, Acid Yellow 17, Acid Yellow 29, Acid Yellow 42, Acridine Yellow G, Acid Yellow 23, Acid Blue 9, Nitro Blue Tetrazolium Chloride Monohydrate or Nitro BT, Rhodamine 6G, Rhodamine 123, Rhodamine B, Rhodamine B Isocyanate, Safranine O, Azure B, and Azure B Eosinate, which are available from Sigma-Aldrich Chemical Company (St. Louis, Mo.). Examples of anionic, water-soluble dyes include, but are not limited to, Direct Yellow 132, Direct Blue 199, Magenta 377 (available from Ilford AG, Switzerland), alone or together with Acid Red 52. Examples of water-insoluble dyes include azo, xanthene, methine, polymethine, and anthraquinone dyes. Specific examples of water-insoluble dyes include Orasol® Blue GN, Orasol® Pink, and Orasol® Yellow dyes available from Ciba-Geigy Corp. Black dyes may include, but are not limited to, Direct Black 154, Direct Black 168, Fast Black 2, Direct Black 171, Direct Black 19, Acid Black 1, Acid Black 191, Mobay Black SP, and Acid Black 2.

In other examples, the colorant can be a pigment. The pigment can be self-dispersed with a polymer, oligomer, or small molecule; or can be dispersed with a separate dispersant. Suitable pigments include, but are not limited to, the following pigments available from BASF: Paliogen®) Orange, Heliogen® Blue L 6901F, Heliogen®) Blue NBD 7010, Heliogen® Blue K 7090, Heliogen® Blue L 7101F, Paliogen®) Blue L 6470, Heliogen®) Green K 8683, and Heliogen® Green L 9140. The following black pigments are available from Cabot: Monarch® 1400, Monarch® 1300, Monarch®) 1100, Monarch® 1000, Monarch®) 900, Monarch® 880, Monarch® 800, and Monarch®) 700. The following pigments are available from CIBA: Chromophtal®) Yellow 3G, Chromophtal®) Yellow GR, Chromophtal®) Yellow 8G, Igrazin® Yellow 5GT, Igralite® Rubine 4BL, Monastral® Magenta, Monastral® Scarlet, Monastral® Violet R, Monastral® Red B, and Monastral® Violet Maroon B. The following pigments are available from Degussa: Printex® U, Printex® V, Printex® 140U, Printex® 140V, Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4. The following pigment is available from DuPont: Tipure®) R-101. The following pigments are available from Heubach: Dalamar® Yellow YT-858-D and Heucophthal Blue G XBT-583D. The following pigments are available from Clariant: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, Novoperm® Yellow HR, Novoperm® Yellow FGL, Hansa Brilliant Yellow 10GX, Permanent Yellow G3R-01, Hostaperm® Yellow H4G, Hostaperm® Yellow H3G, Hostaperm® Orange GR, Hostaperm® Scarlet GO, and Permanent Rubine F6B. The following pigments are available from Mobay: Quindo® Magenta, Indofast® Brilliant Scarlet, Quindo® Red R6700, Quindo® Red R6713, and Indofast® Violet. The following pigments are available from Sun Chemical: L74-1357 Yellow, L75-1331 Yellow, and L75-2577 Yellow. The following pigments are available from Columbian: Raven® 7000, Raven® 5750, Raven® 5250, Raven® 5000, and Raven® 3500. The following pigment is available from Sun Chemical: LHD9303 Black. Any other pigment and/or dye can be used that is useful in modifying the color of the above described inks and/or ultimately, the printed part.

The inkjet composition comprising the colorant may comprise a liquid vehicle. In some examples, the liquid vehicle formulation can include water.

In some examples, an additional co-solvent may also be present. In certain examples, a high boiling point co-solvent can be included in the fusing agent. The high boiling point co-solvent can be an organic co-solvent that boils at a temperature higher than the temperature of the powder bed during printing. In some examples, the high boiling point co-solvent can have a boiling point above 250° C. In still further examples, the high boiling point co-solvent can be present at a concentration from about 1 wt % to about 4 wt %.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

A surfactant, or combination of surfactants, can also be present in the inkjet composition comprising the colorant. Examples of surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. The amount of surfactant added to the formulation of this disclosure may range from 0.01 wt % to 20 wt %. Suitable surfactants can include, but are not limited to, liponic esters such as Tergitol™ 15-S-12, Tergitol™ 15-S-7 available from Dow Chemical Company, LEG-1 and LEG-7; Triton™ X-100; Triton™ X-405 available from Dow Chemical Company; and sodium dodecylsulfate.

Various other additives can be employed to optimize the properties of the inkjet composition comprising the colorant. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities. Buffers may also be used to control the pH of the composition. Viscosity modifiers may also be present. Such additives can be present at from 0.01 wt % to 20 wt %.

Printing Method

As described above, the present disclosure also provides a method for three-dimensional printing. The method comprises depositing a layer of powder bed material on a build platform. The powder bed material comprises thermoplastic polymer and colour-masking pigment, wherein the colour-masking pigment is present in an amount of 0.1 to 10 wt % based on the total weight of the powder bed material. The build platform may comprise a supporting platform, or may comprise a supporting platform and previously formed layers of the 3-D printed part. Thus, the layer of powder bed material may be deposited onto the supporting platform to form a first layer of the 3-D printed part, or the layer of powder bed material may be deposited directly onto previously formed layers of the 3-D printed part.

Based on a 3D object model, a fusing agent is then selectively applied onto at least a portion of the layer of the powder bed material.

Thereafter, the powder bed material is heated to at least partially bind the portion of the powder bed material. For example, once the fusing agent is selectively applied to at least a portion of the layer of the powder bed material, the powder bed material may be irradiated, for instance, with near infrared or infrared radiation. This irradiation may cause the infrared or near infrared absorbing compound of the fusing agent to release thermal energy. This thermal energy may be used to heat the powder bed material to at least partially bind the fusing agent-treated portion of the powder bed material.

The printing method described herein may be carried out using a 3-dimensional printing system. The system may comprise a powder bed comprising powder bed material comprising thermoplastic polymer and colour-masking pigment, wherein the colour-masking pigment is present in an amount of 0.1 to 10 wt % of the total weight of the powder bed material. The system may also comprise a source of infrared or near infrared radiation, and an inkjet printer comprising an inkjet print nozzle and an ink reservoir containing a fusing agent.

An example of a 3-dimensional printing system is shown in FIG. 1. The system 100 includes a powder bed 110 comprising a powder bed material 115, which includes particles comprising thermoplastic polymer (e.g. polyamide-12) and colour-masking pigment. In the example shown, the powder bed material is deposited on a supporting platform or moveable floor 120 that allows the powder bed to be lowered after each layer of the 3-dimensional part is printed. The 3-dimensional part 127 is shown after printing the fusing agent 140 on the powder bed material. The system may also include an ink or fluid jet printer 130 that includes a first ink or fluid jet pen 135 in communication with a reservoir of the fusing agent. The first fluid jet pen can be configured to print the fusing agent onto the powder bed, A second fluid jet pen 145 can be in communication with a reservoir of a colored inkjet liquid composition 150. The second fluid jet pen can be configured to print the colored inkjet liquid composition onto the powder bed. In some examples, the 3-dimensional printing system can also include additional fluid jet pens in communication with a reservoir of liquid to provide other colors and/or functionality, or alternatively, a liquid to provide functionality can be used instead of the colored liquid inkjet composition in the second fluid jet pen.

After the fusing agent 140 has been printed onto the powder bed material 115, an infrared or near infrared source, such as a fusing lamp, 160a or 160b can be used to expose the powder bed to radiation sufficient to fuse the powder that has been printed with the fusing agents. Fusing lamp 160a may be a stationary fusing lamp that rests above the powder bed, and fusing lamp 160b may be carried on a carriage with the fluid jet pens 135, 145. To print the next layer, the moveable floor is lowered and a new layer of powder bed material is added above the previous layer. Unused powder bed material, such as that shown at 115, is not used to form the 3-dimensional part, and thus, can be recycled for future use. Recycling can include refreshing the used powder bed material with a relatively small percentage of fresh powder bed material, e.g., as little as up to 30 wt % (1-30 wt %), up to 20 wt % (1-20 wt %), or up to 10 wt % (1-10 wt %).

To achieve good selectivity between the fused and unfused portions of the powder bed material, the fusing agents can absorb enough infrared or near infrared radiation or energy to boost the temperature of the thermoplastic polymer powder above the melting or softening point of the polymer, while unprinted portions of the powder bed material remain below the melting or softening point. Thus, as mentioned, the 3-dimensional printing system can include preheaters for preheating the powder bed material, and particularly the thermoplastic polymer (e.g. polyamide-12), to a temperature near the melting point. In one example, the system can include a preheater(s) to heat the powder bed material prior to printing. For example, the system may include a print bed heater 174 to heat the print bed to a temperature from 100° C. to 160° C., or from 120° C. to 150° C. The system can further include a supply bed or container 170 which may also include a supply heater 172 at a location where polymer particles are stored before being spread in a layer onto the powder bed 1 10. The supply bed or container can utilize the supply heater to heat the supply bed or container to a temperature from 90° C. to 140° C. Thus, when an overhead heating source 176, e.g., heating lamps, are used to heat up the powder bed material to a printing temperature, the typical minimum increase in temperature for printing can be carried out quickly, e.g., up to about 160 CC to 220° C. To be clear, the overhead heating source used to heat the powder bed material for printing may be a different energy source than the electromagnetic radiation source, e.g., fusing lamp 160a or 160b, used to thermally activate the energy absorber, though these energy sources could be the same depending on the energy absorber and powder bed material chosen for use.

Suitable fusing lamps for use in the 3-dimensional printing system can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure needed to coalesce each printed layer. The fusing lamp can be configured to irradiate the entire powder bed with a substantially uniform amount of energy. This can selectively coalesce the printed portions with fusing agents leaving the unprinted portions of the powder bed material below the melting or softening point.

In one example, the fusing lamp can be matched with the energy absorbers in the fusing agents so that the fusing lamp emits wavelengths of light that match the peak absorption wavelengths of the energy absorbers. An energy absorber with a narrow peak at a particular infrared or near-infrared wavelength can be used with a fusing lamp that emits a narrow range of wavelengths at approximately the peak wavelength of the energy absorber. Similarly, an energy absorber that absorbs a broad range of near-infrared wavelengths can be used with a fusing lamp that emits a broad range of wavelengths. Matching the energy absorber and the fusing lamp in this way can increase the efficiency of coalescing the polymer particles with the energy absorber printed thereon, while the unprinted polymer particles do not absorb as much light and remain at a lower temperature.

Depending on the amount of energy absorber employed, the absorbance of the energy absorber, the preheat temperature, and the melting or softening point of the thermoplastic polymer, an appropriate amount of irradiation can be supplied from the fusing lamp. In some examples, the fusing lamp can irradiate individual layers from about 0.5 to about 10 seconds per pass, e.g., using one or multiple passes which can depend in part on the speed of a pass or passes.

Figure 2:
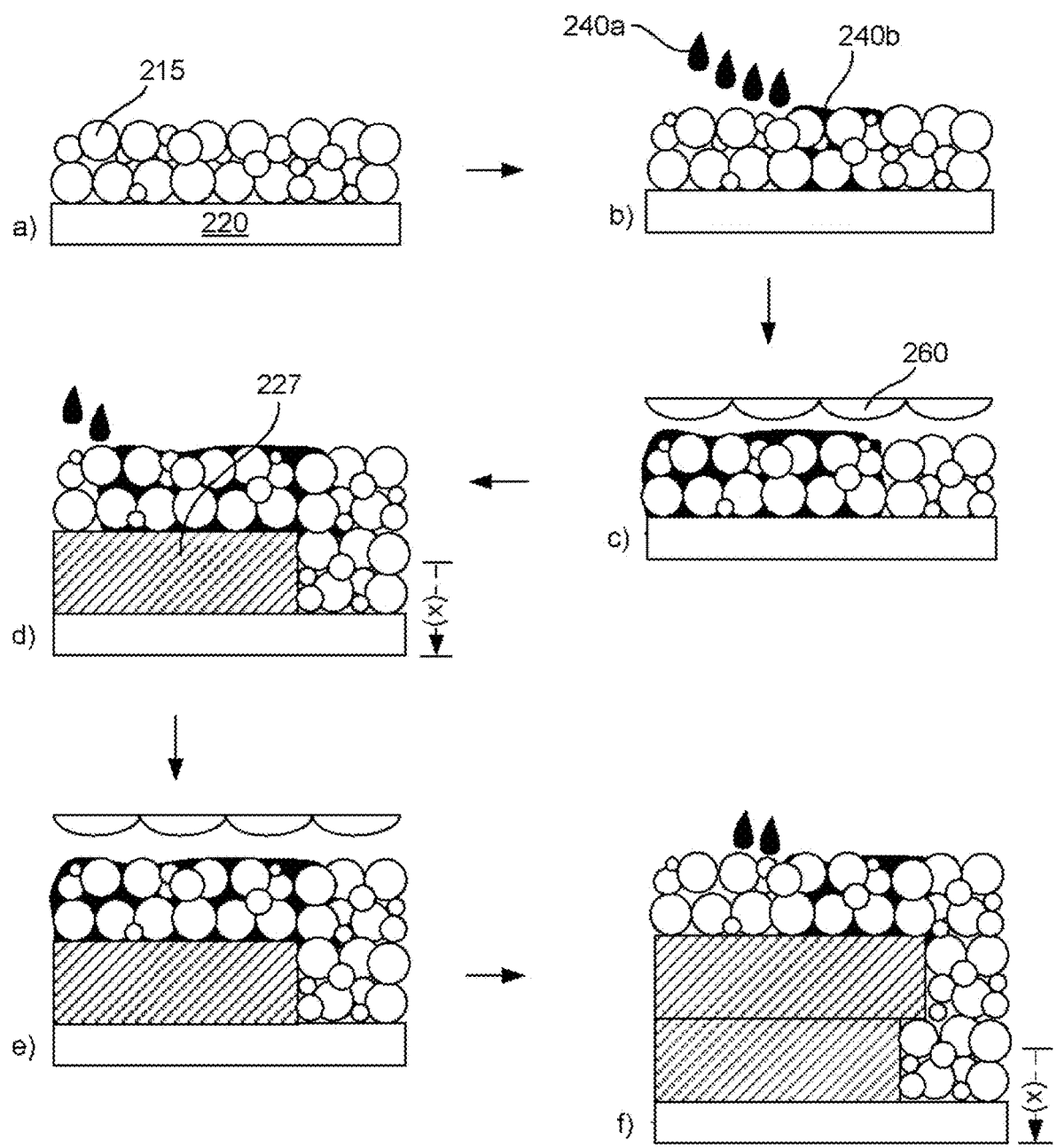
FIG. 2 is a schematic illustration of the 3-dimensional printing method performed using the printing system of FIG. 1.

FIG. 2 provides, by way of example, a further schematic illustration of the printing method described with reference to FIG. 1

Turning to FIG. 2 a), this figure shows a build platform or movable floor 220, to which is deposited a thin layer of powder bed material 215 (which includes the thermoplastic polymer an colour-masking pigment). Next, b) shows droplets of a fusing agent 240a as well as already deposited fusing agent 240b applied to and within a portion of the powder bed material. The fusing agent may admix and fill voids within the build material, as shown in c), where the fusing agent and powder bed material are fused to form a fused part layer 227, and the movable floor is moved downward a distance of (x) corresponding to a 3-dimensional fused part layer thickness where the process if repeated, as shown in FIG. 2 d) to f). In other words, the powder bed material in this example is spread thinly (e.g. 20 μiη to 120 μiη) on the movable floor, combined with fusing agent, fused with electromagnetic energy, the moveable floor dropped, and the process repeated with the prior layer acting as the movable floor for the subsequently applied layer. As can be seen, the second fusible part layer of the "in progress" 3-dimensional part shown at f) is supported by the first fusible part layer as well as by some of the fused powder bed material where the second layer may hang out or cantilever out beyond the first layer. Unfused powder bed material may be collected and reused or recycled. Notably, FIG. 2 does not show any of heating mechanisms that may be present, including a heater for the movable floor, a heater for the powder bed material supply, or overhead heaters that likewise may also be present.

The 3-dimensional part prepared as described herein can be formed of multiple layers of fused polymer stacked in a Z axis direction. The Z axis refers to the axis orthogonal to the x-y plane. For example, in 3-dimensional printing systems having a powder bed floor that lowers after each layer is printed, the Z axis is the direction in which the floor is lowered. The 3-dimensional printed part can have a number of surfaces that are oriented partially in the Z axis direction, such as pyramid shapes, spherical shapes, trapezoidal shapes, non-standard shapes, etc. Thus, virtually any shape that can be designed and which can be self-supporting as a printed part can be crafted.

In further detail, and related to FIGS. 1 and 2, a 3-dimensional printed part can be formed as follows. A fluid or ink jet printer can be used to print a first pass of fusing agent onto a first portion of the powder bed material. In some cases, there may be other fluid pens, such as colored inks or other functional fluids. This can be done on one pass, two passes, three passes, etc. (back and forth may be considered two passes). If the electromagnetic radiation source is not a bar that sits overhead (which can be left in an on position, or cycled to turn on and off at appropriate times relative to fusing agent application), but rather may be associated with the printing carriage, an irradiation pass can then be performed by passing a fusing lamp over the powder bed to fuse the thermoplastic polymer with the fusing agent. Multiple passes may be used in some examples. Individual passes of printing and irradiating can be followed by further deposit of the powder bed material.

EXAMPLES

The following illustrates various examples of the present disclosure. However, it is to be understood that the Examples are illustrative of the present disclosure.

Example 1—Masking Effect

In this example, white and coloured cubes were printed using powder bed material in accordance with an example of the present disclosure. Specifically, the powder bed material was formed of composite particles comprising titanium dioxide (Evonik) encapsulated by polyamide-12 (VESTOSINT®, Evonik). The composite particles contained 3 wt % titanium dioxide based on the total weight of the composite particles.

The cubes were printed using a 3-D printer as described with reference to FIGS. 1 and 2. For the coloured cubes, colorant was applied by ink jetting an ink jet composition comprising the colorant at concentrations of 3 to 5 wt %.

As a comparison, corresponding white and coloured cubes were printed using the same procedure as described above but in the absence of the titanium dioxide. Thus, the powder bed material was formed from particles of polyamide-12 ((VESTOSINT®, Evonik).

Figure 3:
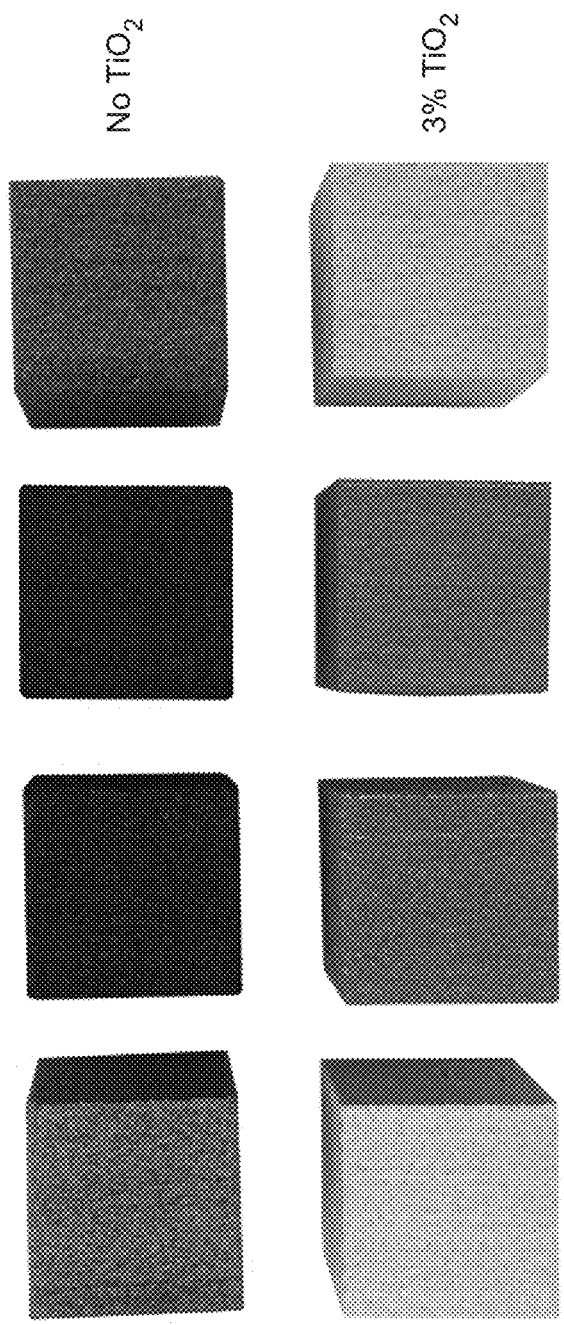
FIG. 3 is a photograph illustrating the results of Example 1.

FIG. 3 is a photograph of the cubes produced using the two different powder base materials. As can be seen from the figure, the white and coloured cubes produced using the composite particles have improved whiteness and brightness/vibrancy of colour.

Example 2—TiO₂ Loadings

Figure 4:
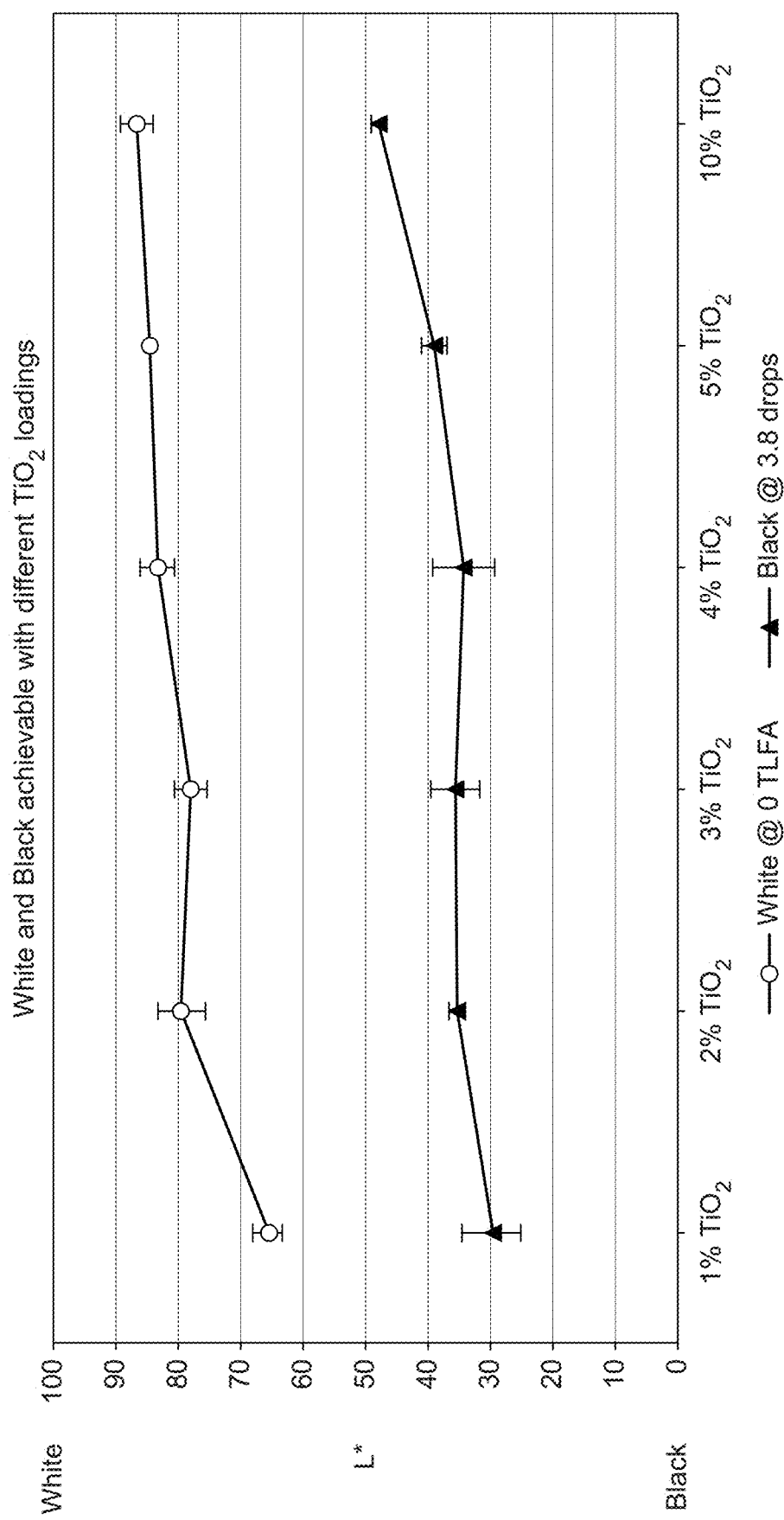
FIGS. 4 and 5 are graphs illustrating the results of Example 2.
Figure 5:
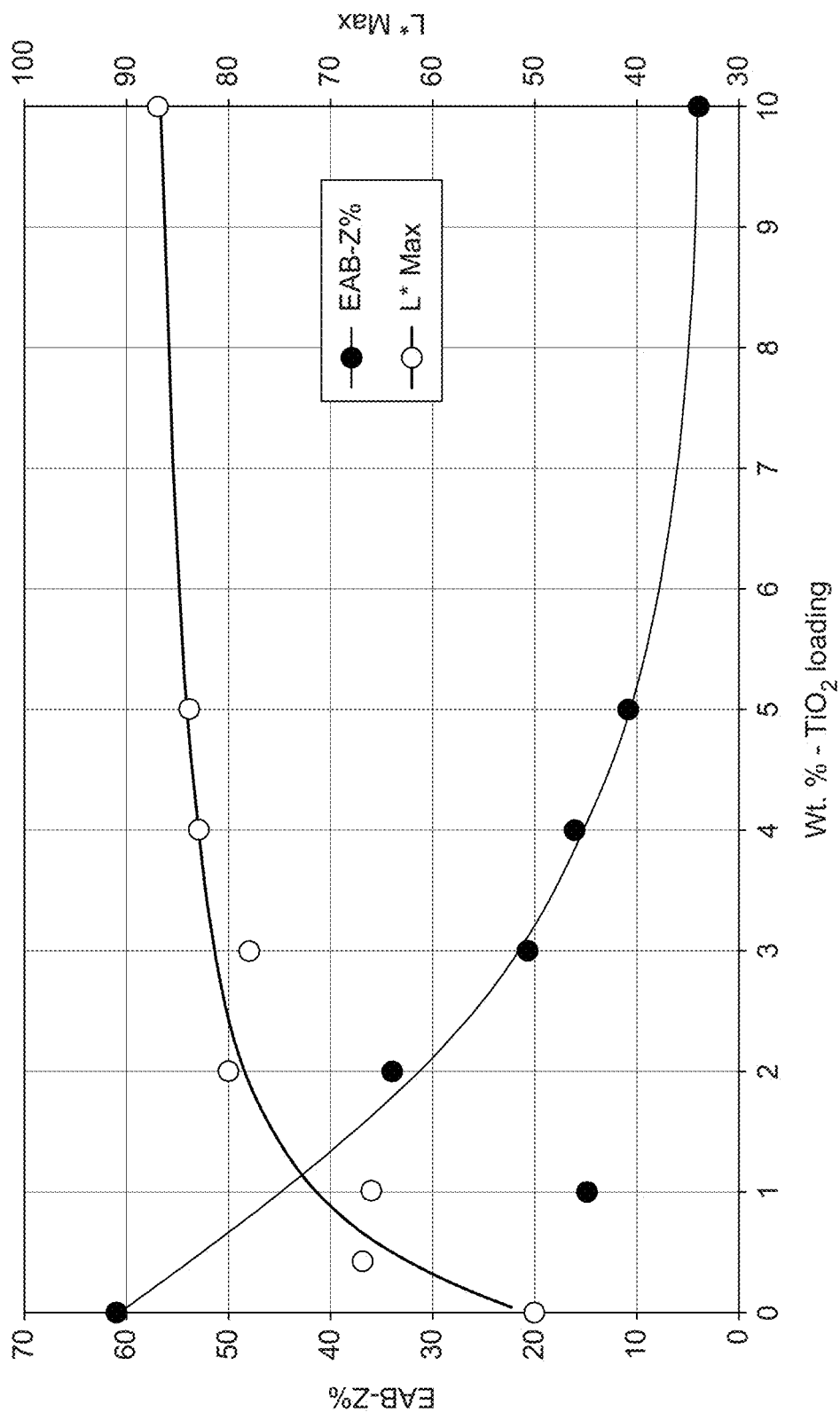

In this Example, the maximum white and maximum black colour performance was determined with varying titanium dioxide (TiO$_2$) concentrations in the composite particles of the powder bed material. While white parts look brighter with higher TiO$_2$ loading in the powder, black parts can appear grey with increasing TiO$_2$ loading. FIG. 4 shows how a trade-off between black and white parts can be achieved by varying TiO$_2$ loadings. The L* of black parts increases with increasing TiO$_2$ loading, which indicates more gray and less black looking parts, while white parts appear whiter as indicated by the higher L* values. Based on these results, a TiO$_2$ loading between 2 wt. % TiO$_2$ and 4 wt. TiO$_2$ can deliver favorable results with both black and white L* values being desirably optimized. However, desirable effects can be obtained at loadings of 0.1 wt % to 10 wt % depending on e.g. the desired L* values, the colorants and colorant concentrations employed and inkjet compositions used to impart colour to the printed part.

It was also observed that higher TiO$_2$ loadings can influence the printed parts' mechanical properties. Error! Reference source not found. shows the maximum L* of white parts and their average elongation at break (EAB −Z %) as a function of TiO$_2$ loading in the powder. Incrementally increasing the TiO$_2$ loading results in strong improvements in L* but can cause mechanical properties to be compromised. Taking white appearance and mechanical properties into account, the optimum TiO$_2$ loading was to 2 wt. % to 3 wt. %. However, desirable effects can be obtained at loadings of 0.1 wt % to 10 wt % depending on e.g. the desired application of the 3-dimensional printed part.

Example 3—Testing Colour-Masking Pigments

Figure 6:
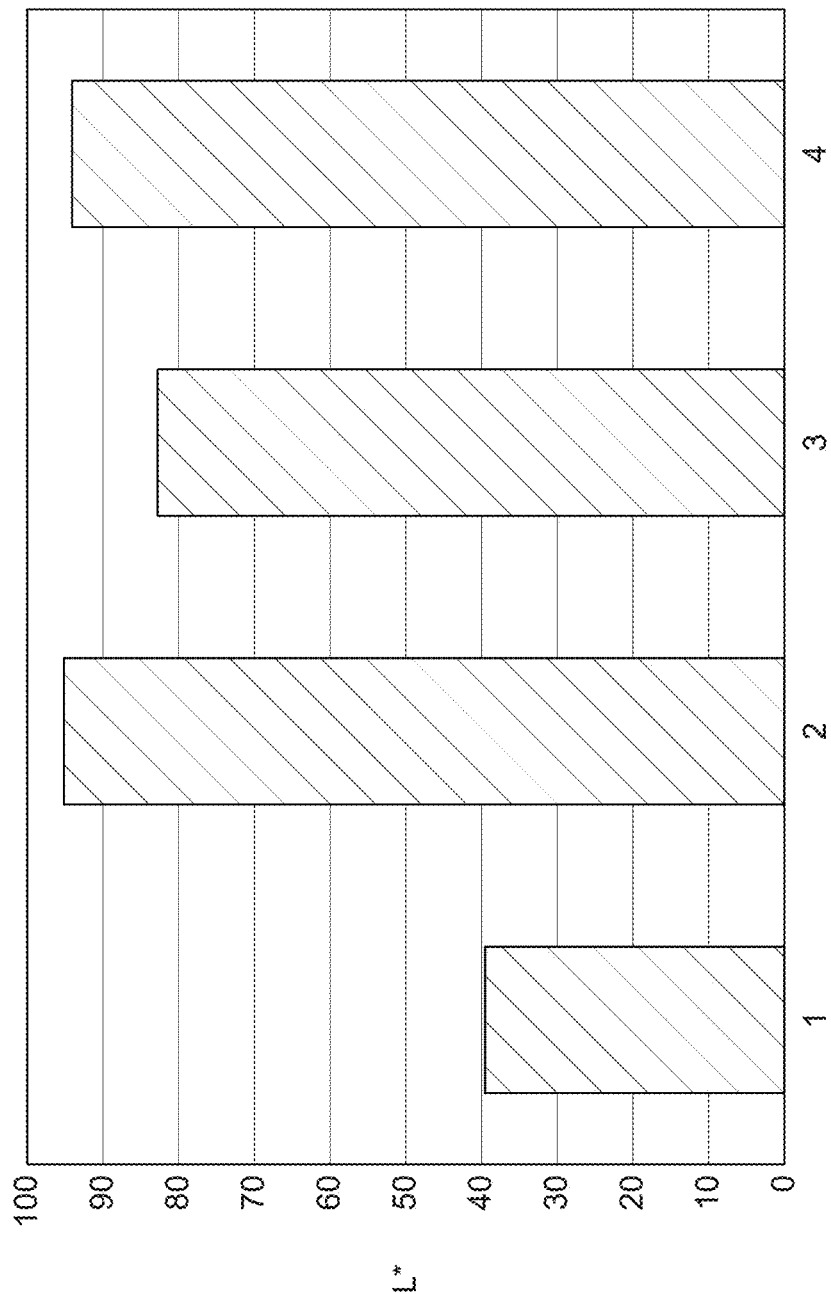
FIG. 6 is a graph illustrating the results of Example 3.

In this Example, the colour-masking effects of boron nitride and titanium dioxide are determined. As a reference, a part was injection moulded from particles of polyamide-12 (VESTOSINT®, Evonik). The L* value of the part was determined (see bar 1 in FIG. 6).

A corresponding part was injection moulded from composite particles of polyamide-12 (VESTOSINT®, Evonik) and 2 wt % TiO$_2$. The TiO$_2$ particles were encapsulated by the polyamide-12. The L* value of the part was determined. The L* values are significantly higher than those of the control (see bar 2 in FIG. 6). This is indicative of good colour performance.

A further part was injection moulded from particles of polyamide-12 (TM, Source) dry blended with particles of boron nitride (BN). The BN concentration in the mixture was 5 wt %. The L* value of the part was determined. The L* values are significantly higher than those of the control (see bar 3 in FIG. 6). This is indicative of good colour performance. However, the colour performance was lower than that achieved with encapsulated TiO$_2$.

Yet a further part was injection moulded from powder bed material containing a) composite particles of polyamide-12 (VESTOSINT®, Evonik) and 2 wt % TiO$_2$, dry blended with b) particles of BN. The BN concentration in the overall mixture was 5 wt %. The L* value of the part was determined. The L* values are significantly higher than those of the control (see bar 5 in FIG. 6). This is indicative of good colour performance. However, the colour performance was comparable with that achieved with encapsulated TiO$_2$.

The invention claimed is:

1. A composition for printing a three-dimensional object, the composition comprising:
    composite particles comprising a thermoplastic polymer and a colour-masking pigment,
    wherein the colour-masking pigment is encapsulated by the thermoplastic polymer and is present in an amount of from about 1.5 to less than about 6 wt % based on the total weight of the composite particles, and wherein the thermoplastic polymer has a relative solution viscosity in 99.5 wt % m-cresol ranging from 1.85 to 2.1.

2. The composition of claim 1, wherein the colour-masking pigment is titanium dioxide, boron nitride, barium sulfate, zinc sulfide, lead carbonate, antimony oxide, zinc oxide or mixtures thereof.

3. The composition of claim 1, wherein the thermoplastic polymer is a polyamide.

4. The composition of claim 1, wherein the composite particles have the following particle size distribution: D50 is from 45 µm to 70 µm, D10 is from 20 µm to 50 µm, and D90 is from 75 µm to 100 µm.

5. A kit for three-dimensional printing comprising:
    a powder bed material comprising thermoplastic polymer and colour-masking pigment, wherein the colour-masking pigment is present in an amount of from about 0.1 to about 10 wt % based on the total weight of the powder bed material, wherein the thermoplastic polymer has a relative solution viscosity in 99.5 wt % m-cresol ranging from 1.85 to 2.1; and a fusing agent comprising a near infrared or infrared absorber.

6. The kit of claim 5, wherein the powder bed material comprises composite particles comprising the thermoplastic polymer and the colour-masking pigment.

7. The kit of claim 6, wherein the colour-masking pigment is encapsulated by the thermoplastic polymer.

8. The kit of claim 5, wherein the powder bed material comprises an admixture of particles of colour-masking pigment and particles of thermoplastic polymer.

9. The kit of claim 5, wherein the thermoplastic polymer is polyamide-12 that includes greater than about 80 meq/g carboxylic end groups and less than about 40 meq/g amino end groups.

10. The kit of claim 5, wherein the powder bed material has an average particle size of from about 20 μm to about 120 μm.

11. The kit of claim 5, wherein the colour-masking pigment is titanium dioxide, boron nitride, barium sulfate, zinc sulfide, lead carbonate, antimony oxide, zinc oxide or mixtures thereof.

12. The kit of claim 5, wherein the colour-masking pigment is present in an amount of from about 1.5 wt % to about 8 wt % based on the total weight of the powder bed material.

13. The kit of claim 5, wherein fusing agent comprises a near infrared absorber comprising carbon black, tungsten bronze, molybdenum bronze, conjugated polymer, aminium dye, tetraaryldiamine dye, cyanine dye, phthalocyanine dye, dithiolene dye, metal phosphate, metal silicate or mixtures thereof.

14. The kit of claim 5, which further comprises an inkjet composition comprising at least one colorant.

15. A method for three-dimensional printing comprising:

depositing a layer of powder bed material on a build platform, wherein the powder bed material comprises thermoplastic polymer and colour-masking pigment, wherein the thermoplastic polymer has a relative solution viscosity in 99.5 wt % m-cresol ranging from 1.85 to 2.1, and wherein the colour-masking pigment is present in an amount of about 0.1 wt % to about 10 wt % based on the total weight of the powder bed material, based on a 3D object model, selectively applying a fusing agent onto at least a portion of the layer of the powder bed material and heating the powder bed material to at least partially bind the portion of the powder bed material.

* * * * *